Oct. 23, 1928. F. K. MURPHY ET AL Re. 17,110

FLUID OPERABLE LUBRICATOR AND FEEDER FOR ENGINES

Original Filed July 6, 1925

INVENTORS.
FRED K. MURPHY
RAY W. RETTERER.

BY

ATTORNEYS.

Reissued Oct. 23, 1928. Re. 17,110

UNITED STATES PATENT OFFICE.

FRED K. MURPHY AND RAY W. RETTERER, OF INDIANAPOLIS, INDIANA.

FLUID-OPERABLE LUBRICATOR AND FEEDER FOR ENGINES.

Original No. 1,620,911, dated March 15, 1927, Serial No. 41,771, filed July 6, 1925. Application for reissue filed August 3, 1928. Serial No 297,205.

This invention relates to a force feed lubricator and distributor for locomotives and stationary engines.

The chief object of the invention is to provide a positive supply of lubricant to an engine of the stationary or locomotive type only when the moving parts thereof are moving under the influence of fluid pressure that is doing work.

The chief feature of the invention consists in the operation of a forced feed lubricator by the constantly applied pressure employed in the prime mover and associating therewith a distributor of a novel character also operable by fluid pressure employed in the prime mover. In the latter instance the distributor is operable by the differential diaphragm pressures, the larger diaphragm being associated with the lower pressure which is intermittently applied.

Figure 1:
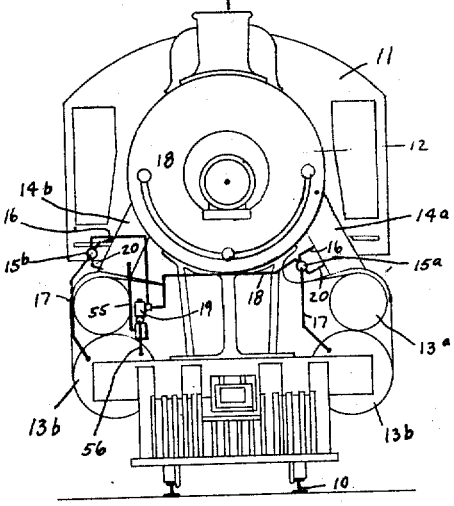
Figure 2:
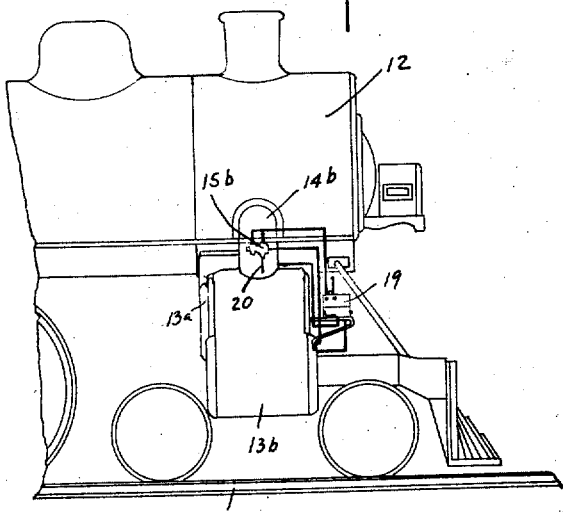
Figure 4:
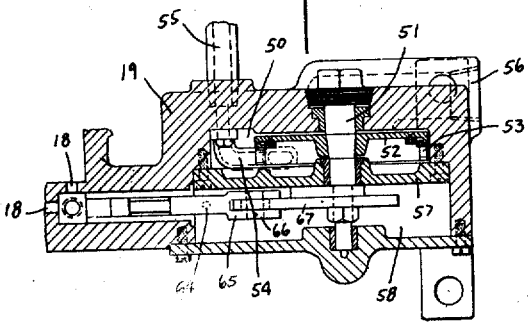
Figure 6:
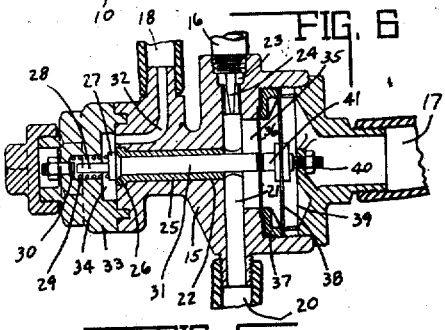
Figure 3:
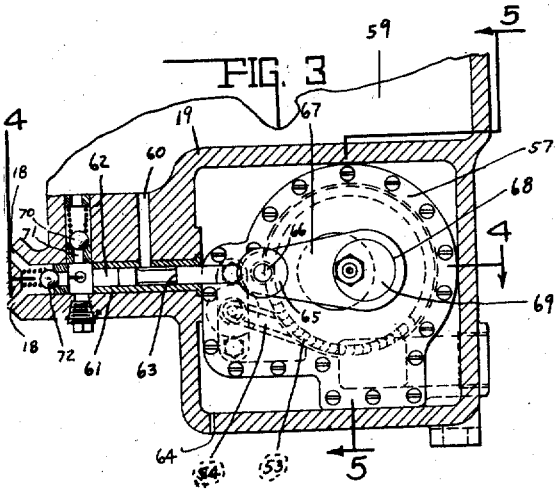
Figure 5:
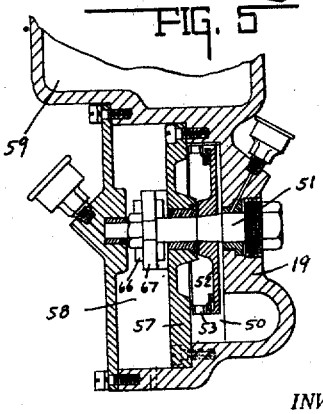

The full nature of the invention will be understood from the accompanying drawings and the following description and claims:

In the drawings Fig. 1 is a front view of a locomotive showing the invention associated therewith, the several parts of the piping being shown diagrammatically. Fig. 2 is a side elevational view of the same. Fig. 3 is an enlarged central sectional view of the lubricator and the power connection therefor. Fig. 4 is a sectional view taken on line 4—4 of Fig. 3 of the lubricator and in the direction of the arrows. Fig. 5 is a sectional view taken on line 5—5 of Fig. 3 and in the direction of the arrows and of the same mechanism shown in Fig. 4, to wit, the power connection and the power unit. Fig. 6 is a central sectional view through the distributor.

In the drawings 11 indicates a locomotive having a boiler 12, cylinders $13^a$ and $13^b$ and supply lines $14^a$ and $14^b$. Associated with each supply line is a distributor herein indicated respectively by the numerals $15^a$ and $15^b$.

Each distributor is connected by a conduit 16 to the source of high pressure steam, to wit, the conduit 14. A conduit 17 is connected to the distributor at one end and to the engine cylinder supply at the other, thus subjecting the distributor to intermittent pressure. A conduit 18 is connected to the lubricator indicated generally by the numeral 19. Said conduit 18 constitutes a high pressure lubricant supply line and serves to supply oil from the lubricator to the distributor 15. A line 20 connects the distributor to the supply line connected to the cylinder and thus the lines 16 and 20 are connected through the distributor and form a by-pass leading from and thence to the supply line 14 of the engine.

Reference will now be had to Fig. 6, wherein the details of the distributor device are shown. The body portion indicated generally by the numeral 15 includes a pair of transverse communicating channels 21 and 22. The channel 21 communicates at one end with conduit 16 and at the other end with the conduit 20. A bushing 23 has a tapered outlet or passage 24 discharging into said passage 21. The channel 22 receives a sleeve 25 which terminates at the end opposite from the end communicating with the conduit 21 in a valve seat 26. A valve 27 is associated therewith and carries a stem 28 for aligning the coil spring 29 and abutting an adjustable stop 30. The valve 27 also is extended and carries a body portion 31 that has a predetermined fit within said sleeve 25. A channel 32 communicates with conduit 18 at one end and thus the lubricator is supplied with lubricant under high pressure. The cap 33 carried by the distributor 15 includes a valve chamber 34 and this valve chamber communicates with the conduit 21 when the valve 27 is removed from its seat 26 through the predetermined fit between the stem 31 and the sleeve 25.

The opposite end of the body 15 includes a chamber 35 in which is secured a diaphragm 36 retained in position by a retainer 37, in turn supporting another diaphragm 38, likewise retained in position within a chamber 39. An adjustable stop 40 is provided for the diaphragm 38 and a stop 41 carried by the diaphragm 38 has engagement with diaphragm 36.

The operation of the distributor device is as follows: Whenever steam is supplied to the engine cylinder, and preferably the front end, and this occurs intermittently, pressure is applied to chamber 39. Diaphragm 38 moves toward the left with abutment 41. This engages diaphragm 36 and moves the same to engage the end of the stem 31 and unseat the valve 27 from its seat 26. This permits the lubricant supplied by line 18 under high pressure, to pass from the valve chamber 34 to the passage 21.

High pressure steam also is passed through the body 15 from conduit 16 to conduit 20. Through the nozzle arrangement, and jet action, the steam carries with it a predetermined amount of oil determinable by the fit and travel of stem 31 in bushing 22 and by the regulated opening of the valve, the latter being adjusted through abutment 30. When the steam pressure supplied to the chamber 39 is released by being exhausted to the atmosphere or passed into a low pressure cylinder or to accessories as is the common practice, the diaphragm 36 becomes effective and returns diaphragm 38 to its original position. Said diaphragms are limited in their travel to the right by abutment 41 and the adjustable stop 40. At the same time, the spring 29 has seated the valve 27 and the lubricant supply is discontinued. Upon failure of the steam supply it will be readily apparent that the spring 29 cuts off the lubricant supply. Thus the distributor is adapted to withhold the lubricant from the device at such times as the movable parts are not movable under fluid pressure.

Reference will now be had to Figs. 1 to 5 inclusive, wherein the lubricator 19 is illustrated. The lubricator 19 is connected by the lines 18 to the distributor previously described. Said lubricator includes a body portion indicated generally by the numeral 19, containing a chamber 50, in which is rotatably supported a shaft 51 which carries a wheel 52 provided with turbine vanes or blades 53 upon the periphery or side thereof. A nozzle 54 is connected by line 55 to the source of high pressure steam, to wit, the supply pipe or conduit 14. The steam, after engaging the blades and causing the turbine wheel to rotate, passes outwardly and exhausts through the port or passage 56. This is connected to the exhaust pipe of the engine or the same may be connected to a low pressure cylinder, atmosphere, or to accessories as is customary practice.

The lubricator housing 19 includes a partition 57 which forms a chamber 58 therein. The housing 19 includes or supports a reservoir 59 which communicates through conduit 60 and a pump mechanism with the high pressure check protected lubricant supply lines 18.

The pump mechanism comprises a sleeved cylinder 61 slidably supporting a piston 62 carried by a piston rod 63. Said piston rod terminates in a yoke 65 which pivotally supports at 66 a crank arm 67 which has a circular opening 68 adapted to receive a circular cam 69 eccentrically positioned with respect to the shaft axis and which is carried by the shaft 51.

Rotation by the shaft 51 of the eccentric and crank mechanism reciprocates the pump piston 62 to force the lubricant from the supply line 60 connected to the reservoir into the high pressure lines 18 leading to the distributor. It is to be understood that these lines contain a check valve 72; interposed between the pump discharge and the conduits 18 to prevent return flow of the oil upon the return stroke of the piston. A supply controlling check valve may be provided to prevent return to the reservoir of the supply upon the power stroke of the pump piston, also check valve 70 in passage 71 acts as a relief valve.

From the foregoing it will be noted that the lubricator and distributor devices are so arranged that the high pressures are all contained within enclosed casings and the lubricator and distributor parts are what may be termed directly connected together, thereby eliminating the necessity of stuffing boxes and the like heretofore required.

The invention claimed is:

1. In a lubricating system for fluid operable engines, the combination with a source of high pressure fluid, and a source of low pressure fluid, of a pressure lubricator including a lubricant pump piston and a crank construction for reciprocating said piston and mechanically connected therewith, a distributor connected to the lubricator and the high pressure fluid source including means differentially subjected to both fluid sources, and fluid operable rotary power means connected to one of said pressure sources for reciprocating said crank.

2. In a lubricating system for fluid operable engines, the combination with a source of high pressure fluid, and a source of low pressure fluid, of a pressure lubricator including a lubricant pump piston and a crank construction for reciprocating said piston and mechanically connected therewith, a distributor connected to the lubricator and the high pressure fluid source including means differentially subjected to both fluid sources, a fluid operable turbine connected to one of said fluid pressure sources, and means connecting the turbine to the crank for translating rotational movement of the former into reciprocating movement of the latter.

3. In a lubricating system for fluid operable engines, the combination with a source of high pressure fluid and a source of lower pressure fluid, of a pressure lubricator including a reciprocating plunger, a fluid operable turbine therefor, a crank and eccentric connection between said turbine and plunger, and a distributor connected to the lubricator and the high pressure fluid source including means differentially subjected to both fluid pressure sources.

4. In a lubricating system for fluid operable engines, the combination with a source of high pressure fluid and a source of lower pressure fluid, of a pressure lubricator, a fluid operable turbine therefor, and a distributor connected to the lubricator and the high pressure fluid source including means differentially subjected to both fluid pressure sources.

5. In a lubricating system the combination of a valve, a reciprocable stem therefor, a passage controlled by the valve and substantially occupied by the stem, a supply chamber communicating with one end of the passage by way of the valve, a restricted fluid pressure supplying passage communicating with the other end of said first mentioned passage, and reciprocable differential pressure operable means for actuating said valve.

6. In a lubricating system the combination of a valve, a reciprocable stem therefor, a passage controlled by the valve and substantially occupied by the stem, a supply chamber communicating with one end of the passage by way of the valve, a restricted fluid pressure supplying passage communicating with the other end of said first mentioned passage, reciprocable differential pressure means in axial alignment with said valve for actuating the same, and adjustable stops at opposite ends of the stem and reciprocable means for limiting reciprocable movement in opposite directions.

7. In a lubricating system for a fluid operable device, the combination of a source of constant fluid pressure, a source of intermittent pressure fluid, a fluid operable lubricator for supplying lubricant under pressure, a distributor to atomize the pressure supplied lubricant for said device connected to the lubricator, and the constant pressure fluid source, and to said device, and means subjected to said constant pressure fluid source and intermittently to the intermittent pressure source for controlling the lubricant supply.

In witness whereof, we have hereunto affixed our signatures.

FRED K. MURPHY.
RAY W. RETTERER.